July 22, 1930.  J. V. MARTIN  1,770,938
STEERING SHOCK ABSORBER
Filed Feb. 27, 1926  2 Sheets-Sheet 1

Fig. 1.

INVENTOR
James V. Martin

July 22, 1930.  J. V. MARTIN  1,770,938
STEERING SHOCK ABSORBER
Filed Feb. 27, 1926   2 Sheets-Sheet 2
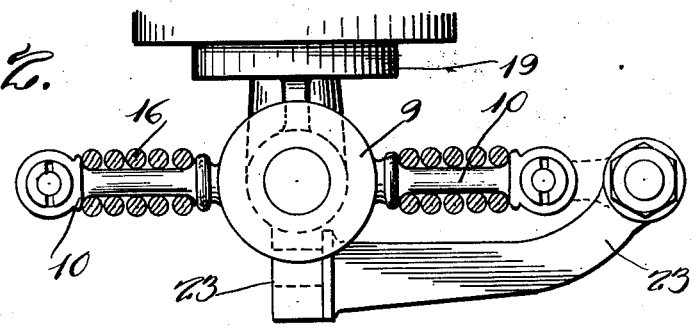
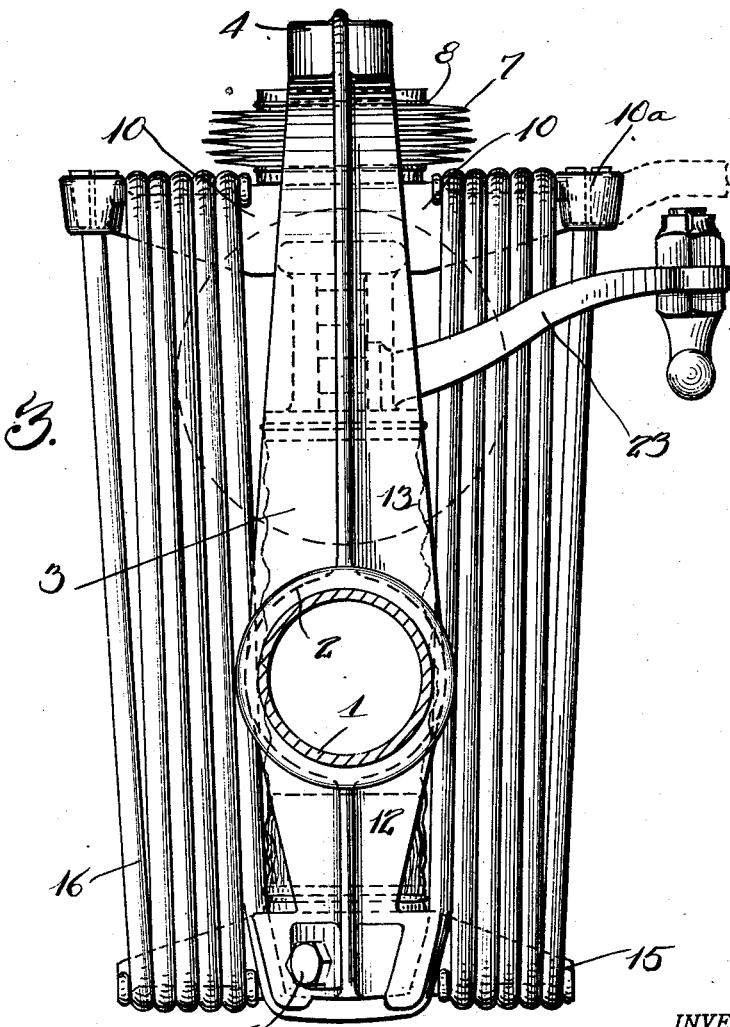
INVENTOR
James V. Martin Patented July 22, 1930

1,770,938

UNITED STATES PATENT OFFICE

JAMES V. MARTIN, OF GARDEN CITY, NEW YORK

STEERING SHOCK ABSORBER

Application filed February 27, 1926. Serial No. 91,130.

My invention relates to steering and shock-absorbing means for use on vehicles and particularly upon automobiles. The primary object is to simplify the shockabsorbing and steering means by novel combinations.

A further object of my invention is to provide a guide for a shockabsorbing wheel which is protected from grit and dirt and which is provided with an oil tight enclosure.

A further object of my invention is to provide rubber in both tension and compression for use as a shockabsorber in combination with the axles and wheels of automobiles.

The still further objects of my invention will become readily apparent from the study of the following drawings and detailed description:—

Fig. 1 is a front elevation of my invention showing the steering wheel and the shockabsorber in its extreme low position.

Fig. 2 is a view of my invention looking down from above or a plan view of the shockabsorber and steering arm.

Fig. 3 is a side elevation showing the steering arm, bellows and shockabsorber in the fully extended position.

Referring by numerals to the details 1 is a bracket or main axle member carrying the body of the vehicle, 2 is a tubular collar riveted to the bracket and a rigid part thereof having the T section forks 3 and $3^a$ which are of tube form at their ends as at 4 and $4^a$ where they surround and support steel tube guide 5 secured by bolts 6. The top fork 3 also carries the upper end of a bellows 7 held in oil and dirt tight relation to the expanded portion of 4 by the ring 8. The lower portion of the bellows has a similar connection with the stub axle member 9, which has its bearing around the steel tube 5 on which it turns and also travels vertically.

The lower fork of bracket 1 holds the lower end of guide tube 5 and also carries the end of a bellows 13 by means of oil tight ring 14, the upper end of this bellows being secured by ring $9^b$ to $9^a$ which is rigid with 9 which in turn is rigid with the stub axle 20 in the wheel 17. 12 is a circular tube of sponge rubber used as a rebound bumper at the extreme upward movement of bracket 1, while 11 is the rubber bumper show in compression at the extreme downward position of 1.

10 is an arm carried by the stub axle member 9 forming the upper support and the attachment for rubber bands or cords 16 which yieldingly support the vehicle through tension to bracket arms 15 rigid with $4^a$ and $3^a$.

The wheel 17 is shown as a ribbed disc casting about roller bearings 18 in hub 24 which are retained in place by hub cap 21. 22 and 19 indicate packing rings to prevent oil from leaking out of the bearings. 23 indicates a steering arm or link arm, while $10^a$ is an alternative form of arm.

The invention is an improvement on my former vehicle wheels and shock absorbers as disclosed in Patents Nos. 1,432,771—1,546,500—1,471,968 and my copending application Serial 65,596. Normally the bracket 1 is held in an elevated position several inches above that shown, the rubber cords 16 carrying the static load of the vehicle. When a bump on the road is encountered the wheel 17 is allowed to move upward relative the bracket 1 by stretching the rubbers 16 and this movement may extend to the compression bumper 11; rebound or motion in the opposite direction is taken up by the bumper 12 and if desired by counter tension rubbers arranged from the top of fork 3 to the member 9, where the rubber could be placed in hole 25. It will be noticed that arms 10 turn with the steering wheel, but the arms 15 being rigid with bracket $3^a$ resist turning, thus the invention tends to keep the vehicle in a straight line of progression if the operator leaves go of the steering control which may be of any conventional pattern to arms $10^a$ or 23. The bellows prevent grit or dirt from reaching the oiled surface of the guide tube 5 which serves in the dual capacity of king pin and vertical guide.

Obviously alterations may be made from the particular form shown without departing from the spirit of my invention and I do not limit the invention to the details as such.

What I claim is:—

1. The combination of a forked bracket, a vertical guide held between the ends of the prongs of the said forked bracket, a stub axle member journalled on the said guide between the said prongs, arms on the said axle member for the attachment of rubber bands, corresponding arms upon one of the said prongs, and rubber bands resisting the separation of the said arms.

2. In combination, a supporting device including a supporting member and a vertical guide carried thereby, an arm projecting from the supporting member, a stub axle member including a sleeve slidable and rotatable on the guide, an arm projecting from the sleeve normally parallel to the first arm, and spring means connecting said arms and resisting vertical and rotative movements of the sleeve on the guide.

3. In combination, a supporting device including a vertical guide, a sleeve slidable and rotatable on said guide and having a stub axle projecting therefrom, a pair of arms projecting in opposite directions from the supporting device, a second pair of arms projecting from the sleeve in normally parallel relation to the first arms, and a rubber tension element wound in a series of convolutions around said pairs of arms to extend between the first and second arms.

4. In combination, a supporting device including a vertical guide, a sleeve slidable and rotatable on said guide and having a stub axle projecting therefrom, a pair of arms projecting in opposite directions from the supporting device, a second pair of arms projecting from the sleeve in normally parallel relation to the first arms, a rubber tension element wound in a series of convolutions around said pairs of arms to extend between the first and second arms, sockets on the ends of certain of said arms to receive the ends of said tension element, and means to secure said ends removably in the sockets.

In testimony whereof I affix my signature.

JAMES V. MARTIN.